United States Patent
Bharghavan et al.

(10) Patent No.: US 10,210,497 B2
(45) Date of Patent: Feb. 19, 2019

(54) SYSTEM AND METHOD FOR CASHLESS PEER-TO-PEER PAYMENT

(75) Inventors: Vaduvur Bharghavan, Morgan Hill, CA (US); Jari Malinen, Santa Clara, CA (US); Rajinder Singh, Milpitas, CA (US); Jason Fieldman, Los Angeles, CA (US); Rachna Ahlawat, San Jose, CA (US); Kannan Konath, San Ramon, CA (US); Sandeep Gilotra, Fremont, CA (US)

(73) Assignee: OnDot Systems, Inc., Milpitas, CA (US)

( * ) Notice: Subject to any disclaimer, the term of this patent is extended or adjusted under 35 U.S.C. 154(b) by 0 days.

(21) Appl. No.: 13/080,895

(22) Filed: Apr. 6, 2011

(65) Prior Publication Data

US 2012/0259779 A1     Oct. 11, 2012

(51) Int. Cl.
*G06Q 20/22* (2012.01)

(52) U.S. Cl.
CPC .................. *G06Q 20/22* (2013.01)

(58) Field of Classification Search
CPC ........ G06Q 10/00; G06Q 20/00; G06Q 30/00; G06Q 40/00
USPC ...................................... 705/3–44
See application file for complete search history.

(56) References Cited

U.S. PATENT DOCUMENTS

| | | | |
|---|---|---|---|
| 5,708,422 A | 1/1998 | Blonder | |
| 5,884,289 A | 3/1999 | Anderson | |
| 5,953,710 A | 9/1999 | Fleming | |
| 6,029,154 A | 2/2000 | Pettitt | |
| 6,122,624 A | 9/2000 | Tetro | |
| 6,343,279 B1 | 1/2002 | Bissonette | |
| 6,422,462 B1 | 7/2002 | Cohen | |
| 6,516,056 B1 | 2/2003 | Justice | |
| 7,427,033 B1 | 9/2008 | Roskind | |
| 7,784,684 B2 | 8/2010 | Labrou et al. | |
| 7,793,851 B2 | 9/2010 | Mullen | |
| 7,798,416 B2 | 9/2010 | Roskind | |
| 7,801,826 B2 * | 9/2010 | Labrou ................. | G06Q 20/02 705/50 |
| 7,813,725 B2 | 10/2010 | Celik | |
| 7,822,688 B2 | 10/2010 | Labrou et al. | |
| 7,828,220 B2 | 11/2010 | Mullen | |
| 8,020,763 B1 * | 9/2011 | Kowalchyk .......... | G06Q 20/102 235/380 |

(Continued)

OTHER PUBLICATIONS

"Sniffing Tutorial part 1—intercepting Network Traffic", NETRESEC Network Security Blog. Web. , Mar. 11, 2011. http://www.netresec.com/?page=Blog&month=2011-03&post=Sniffing-Tutorial-part-1—Intercepting-Network-Traffic.

*Primary Examiner* — Frantzy Poinvil
(74) *Attorney, Agent, or Firm* — Law Office of Dorian Cartwright; Dorian Cartwright (57) ABSTRACT

A method for a server performing a wireless payment transaction is disclosed. The method comprises providing a server web page or native application including options for a user selecting a role as payer or payee; requesting information from the payee including a transaction ID provided by the server; requesting information from the payer including the transaction ID; initiating an authorization of the transaction on a credit or debit account of the payer; initiating a transaction to credit the payee's account; and completing the transaction with the payer by initiating the offline clearing of the transaction.

12 Claims, 4 Drawing Sheets

(56) References Cited

U.S. PATENT DOCUMENTS

| | | |
|---|---|---|
| 8,127,982 B1 | 3/2012 | Casey |
| 8,584,937 B1 * | 11/2013 | Kowalchyk .......... G06Q 20/102 |
| | | 235/380 |
| 8,700,729 B2 * | 4/2014 | Dua ...................... G06Q 20/20 |
| | | 705/64 |
| 8,706,620 B2 | 4/2014 | Ciurea |
| 8,762,211 B2 * | 6/2014 | Killian ............... G06Q 20/0855 |
| | | 705/17 |
| 8,781,960 B2 * | 7/2014 | Marshall ............... G06Q 20/10 |
| | | 235/379 |
| 8,857,710 B1 * | 10/2014 | Kowalchyk .......... G06Q 20/102 |
| | | 235/380 |
| 9,324,105 B2 * | 4/2016 | Kopikare ............. H04W 8/005 |
| 93,241,005 | 4/2016 | Kopikare |
| 2002/0035539 A1 | 3/2002 | O'Connell |
| 2002/0082995 A1 | 6/2002 | Christie, IV |
| 2002/0111886 A1 | 8/2002 | Chenevich et al. |
| 2002/0123938 A1 | 9/2002 | Yu |
| 2002/0152123 A1 | 10/2002 | Giordano et al. |
| 2002/0194141 A1 | 12/2002 | Langensteiner |
| 2002/0198806 A1 | 12/2002 | Blagg |
| 2003/0028481 A1 | 2/2003 | Flitcroft |
| 2004/0039694 A1 | 2/2004 | Dunn |
| 2004/0068653 A1 | 4/2004 | Fascenda |
| 2004/0128243 A1 | 7/2004 | Kavanagh |
| 2005/0097019 A1 | 5/2005 | Jacobs |
| 2005/0102243 A1 | 5/2005 | Kinsella |
| 2005/0187873 A1 * | 8/2005 | Labrou ................. G06Q 20/02 |
| | | 705/40 |
| 2005/0240527 A1 | 10/2005 | Goldman |
| 2005/0268003 A1 | 12/2005 | Wang |
| 2006/0085337 A1 | 4/2006 | Conforti et al. |
| 2006/0178986 A1 | 8/2006 | Giordano et al. |
| 2007/0039049 A1 | 2/2007 | Kupferman et al. |
| 2007/0124256 A1 | 5/2007 | Crooks et al. |
| 2008/0101283 A1 | 5/2008 | Calhoun et al. |
| 2008/0120235 A1 | 5/2008 | Chu |
| 2008/0147523 A1 | 6/2008 | Mulry et al. |
| 2008/0228648 A1 | 9/2008 | Kemper |
| 2008/0257952 A1 | 10/2008 | Zandonadi |
| 2008/0263402 A1 | 10/2008 | Braysy |
| 2009/0094123 A1 * | 4/2009 | Killian ............... G06Q 20/0855 |
| | | 705/16 |
| 2009/0112651 A1 | 4/2009 | Atkinson |
| 2009/0132424 A1 | 5/2009 | Kendrick et al. |
| 2009/0138968 A1 | 5/2009 | Serber |
| 2009/0164327 A1 | 6/2009 | Bishop et al. |
| 2009/0164330 A1 | 6/2009 | Bishop et al. |
| 2009/0254462 A1 | 10/2009 | Tomchek et al. |
| 2009/0313147 A1 * | 12/2009 | Balasubramanian ........................ |
| | | G06Q 20/108 |
| | | 705/30 |
| 2010/0051684 A1 | 3/2010 | Powers |
| 2010/0063903 A1 | 3/2010 | Whipple et al. |
| 2010/0106611 A1 | 4/2010 | Paulsen |
| 2010/0114776 A1 | 5/2010 | Weller et al. |
| 2010/0153224 A1 | 6/2010 | Livnat |
| 2010/0274720 A1 | 10/2010 | Carlson |
| 2010/0325047 A1 | 12/2010 | Carlson et al. |
| 2011/0238564 A1 | 9/2011 | Lim et al. |
| 2011/0251892 A1 | 10/2011 | Laracey |
| 2012/0030109 A1 | 2/2012 | Dooley Maley |
| 2012/0036013 A1 | 2/2012 | Neuhaus |
| 2012/0059758 A1 | 3/2012 | Carlson |
| 2012/0072347 A1 | 3/2012 | Conway |
| 2012/0095918 A1 | 4/2012 | Jurss |
| 2012/0143730 A1 | 6/2012 | Ansari et al. |
| 2012/0197708 A1 | 8/2012 | Mullen et al. |
| 2012/0197802 A1 | 8/2012 | Smith |
| 2012/0225639 A1 | 9/2012 | Gazdzinski |
| 2012/0271697 A1 | 10/2012 | Gilman |
| 2012/0303525 A1 | 11/2012 | Sahadevan |
| 2013/0138516 A1 | 5/2013 | White |
| 2013/0282593 A1 | 10/2013 | Merz |
| 2013/0290121 A1 | 10/2013 | Simakov et al. |
| 2013/0297387 A1 * | 11/2013 | Michael ............... G08G 1/0112 |
| | | 705/13 |
| 2013/0332361 A1 | 12/2013 | Ciurea |
| 2013/0332362 A1 | 12/2013 | Ciurea |
| 2013/0346294 A1 | 12/2013 | Faith |
| 2014/0040135 A1 | 2/2014 | Ovick et al. |
| 2014/0095947 A1 | 4/2014 | Mozak |
| 2014/0258119 A1 | 9/2014 | Canis |
| 2014/0304055 A1 | 10/2014 | Faith |
| 2014/0316994 A1 * | 10/2014 | Hagemann ............ G06F 21/36 |
| | | 705/75 |
| 2014/0358769 A1 | 12/2014 | Howe et al. |
| 2015/0100499 A1 * | 4/2015 | Dua ...................... G06Q 20/20 |
| | | 705/76 |
| 2015/0242949 A1 | 8/2015 | Phillips, IV |
| 2015/0339667 A1 * | 11/2015 | Dua ...................... G06Q 20/20 |
| | | 705/16 |
| 2016/0019533 A1 * | 1/2016 | Wu .................... G06Q 20/3674 |
| | | 705/67 |
| 2017/0236118 A1 * | 8/2017 | Laracey ............ G06Q 20/4014 |
| | | 705/44 |

* cited by examiner

SYSTEM AND METHOD FOR CASHLESS PEER-TO-PEER PAYMENT

TECHNICAL FIELD

The present invention relates generally to wireless payment systems, and more particularly, some embodiments relate to systems and methods for cashless peer-to-peer payment.

DESCRIPTION OF THE RELATED ART

Existing wireless payment systems include those for purchasing goods and services using a mobile phone and methods of initializing mobile payment software at a secure transaction server (STS). Such systems may be used to perform a mobile phone cashless monetary transaction over the mobile phone network according to one or more protocols. However, such systems suffer from a number of drawbacks.

One disadvantage of conventional wireless payment systems is that they require an STS server account for users to perform transactions. Additionally, such systems do not enable card-to-card payments where source and target are credit or debit cards without user accounts. Moreover, conventional wireless payment systems do not enable many-to-one and group payment transactions.

BRIEF SUMMARY OF EMBODIMENTS OF THE INVENTION

Embodiments of the present invention provide systems and methods for cashless peer-to-peer payment. One embodiment enables per payment validation of payers using hank control channels to avoid high chargeback rates. By way of example, this mechanism can exchange phone numbers between payer and payee for human verification. Alternatively, a verification method may utilize a typical component such as billing address or zip code per peer-to-peer payment.

According to some embodiments, accounts (such as STS server accounts) are not required to conduct wireless payment transactions. Further embodiments enable card-to-card payments wherein both the source and target can be credit/debit cards without user accounts.

Some embodiments of the invention take into account whether there is a ledger for month-end settlements. In embodiments where an account is used, the system enables payments back and forth within a group and can determine which group members owe payment to other group members based upon reviewing end-of-month balances. As an example, the group members may comprise students sharing the cost of a common residence using peer-to-peer payments. The group payment mode of this peer-payment system and method is distinct from related art in that payers and payees are of the same type. By contrast, conventional group payment schemes can be consumers to merchant, or multiple consumers via NFC to one consumer who does an aggregate payment.

Further embodiments of the invention enable many-to-one payment transactions and group payments. In such embodiments featuring a group scheme, the payers may form an ad hoc group that collects individual payments for a common payment towards a payee. For example, this type of system ay be used by the group to fund a restaurant diner whereby the group members chip in their share of the payment.

According to various embodiments of the invention, a method for a server performing a wireless payment transaction, comprises: providing a server web page or native application including options for a user selecting a role as payer or payee; requesting information from the payee including a transaction ID provided by the server; requesting information from the payer including the transaction ID; initiating an authorization of the transaction on a credit or debit account of the payer; initiating a transaction to credit the payee's account; and completing the transaction with the payer by initiating the offline clearing of the transaction.

Further embodiments of the invention are directed toward a method for a server performing a wireless group payment transaction, comprising: providing a server web page or native application including options for a user selecting a role as payer or payee; requesting information from the payee including a transaction ID provided by the server; requesting information from two or more payers including the transaction ID; initiating an authorization of the transaction on a credit or debit account of each payer; initiating transactions to credit the payee's account; and completing the transactions with the payers by initiating the offline clearing of the transactions.

Additional embodiments of the invention are directed toward a system for a server performing a wireless payment transaction, comprising: a processor; and at least one computer program residing on the processor; wherein the computer program is stored on a non-transitory computer readable medium having computer executable program code embodied thereon, the computer executable program code configured to cause the server to: provide a server web page or native application including options for a user selecting a role as payer or payee; request information from the payee including a transaction ID provided by the server; request information from the payer including the transaction ID; initiate an authorization of the transaction on a credit or debit account of the payer; initiate a transaction to credit the payee's account; and complete the transaction with the payer by initiating the offline clearing of the transaction.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Embodiments of the present invention are directed toward systems and methods for cashless peer-to-peer payment. Some such embodiments make the following assumptions: (i) most consumers today have a cashless payment instrument such as credit card, signature debit card, or pin-debit card; (ii) most consumers today carry a mobile phone that is capable of data communication and has web access; and (iii) cellular data networks have become sufficiently pervasive that it is reasonable to assume constant data connectivity and web access from the phone.

In view of the above-identified assumptions, embodiments of the invention are designed to simplify ad hoc cashless peer-to-peer payment. In particular, some embodiments do not require either the payer or the payee to maintain an account with the server. This is in direct contrast to conventional wireless payment solutions where at least the payee must maintain an account with the server. In addition, certain embodiments of the invention support payment between different types of cashless instruments. By way of example, the payer or payee may choose a credit or debit card.

In some embodiments, the payer and payee do not share credentials. For example, the payer does not need to give the payee a credit or debit card in order to complete a transaction. In addition, embodiments of the invention support both synchronous and asynchronous payment. This can be achieved with a single web page or native application access for each participant (payer and payee). Further embodiments of the invention support payment from multiple payers to a single payee The principles of the invention can be applied in a variety of cases for ad hoc peer-to-peer payment transfer. In an example case, two or more people go to a restaurant, one person pays the bill but all parties split the cost thereafter. Since an account with the server is not required, the entire interaction for the consumer with the server is transactional. In other words, the consumer is able to go to the server website to make or receive a payment. On the website, the consumer enters payment credentials, receives a notification when the payment is complete, and optionally requests a receipt to be delivered asynchronously via email or SMS. The transaction occurs over an existing payment infrastructure and the payer's and payee's credit or debit cards.

Figure 1:
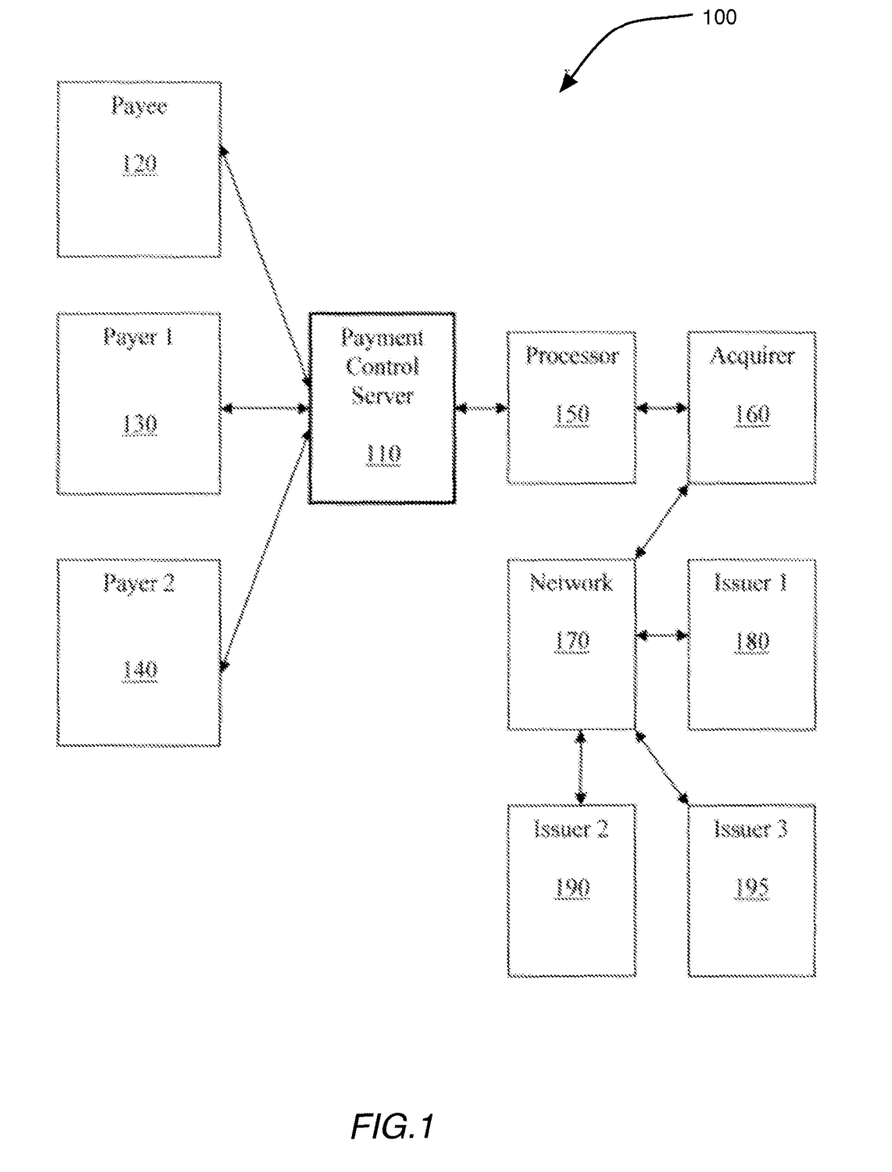
FIG. 1 is a diagram illustrating a system for performing a wireless payment transaction, in accordance with an embodiment of the invention.

Referring to FIG. 1, a system 100 for performing a wireless payment transaction, in accordance with an embodiment of the invention, will now be described. Specifically, the system 100 comprises a payment control server 110 capable of wired or wireless communication with user equipment of payee 120 and user equipment of payers (e.g., payer 130 and payer 140). This user equipment may include, but is not limited to browser or standalone application in a cell phone, tablet, desktop, or other suitable device. Payment control server 110 comprises a processor 150 capable of communications with an acquirer 160 including a network 170 for communicating with a plurality of issuers 180, 190, 195. By way of example, the network 170 may comprise the United States credit card payments network. In addition, issuer 180 may comprise the payee's issuer, issuer 190 may comprise the issuer of payer 130, while issuer 195 may comprise the issuer of payer 140.

Figure 2:
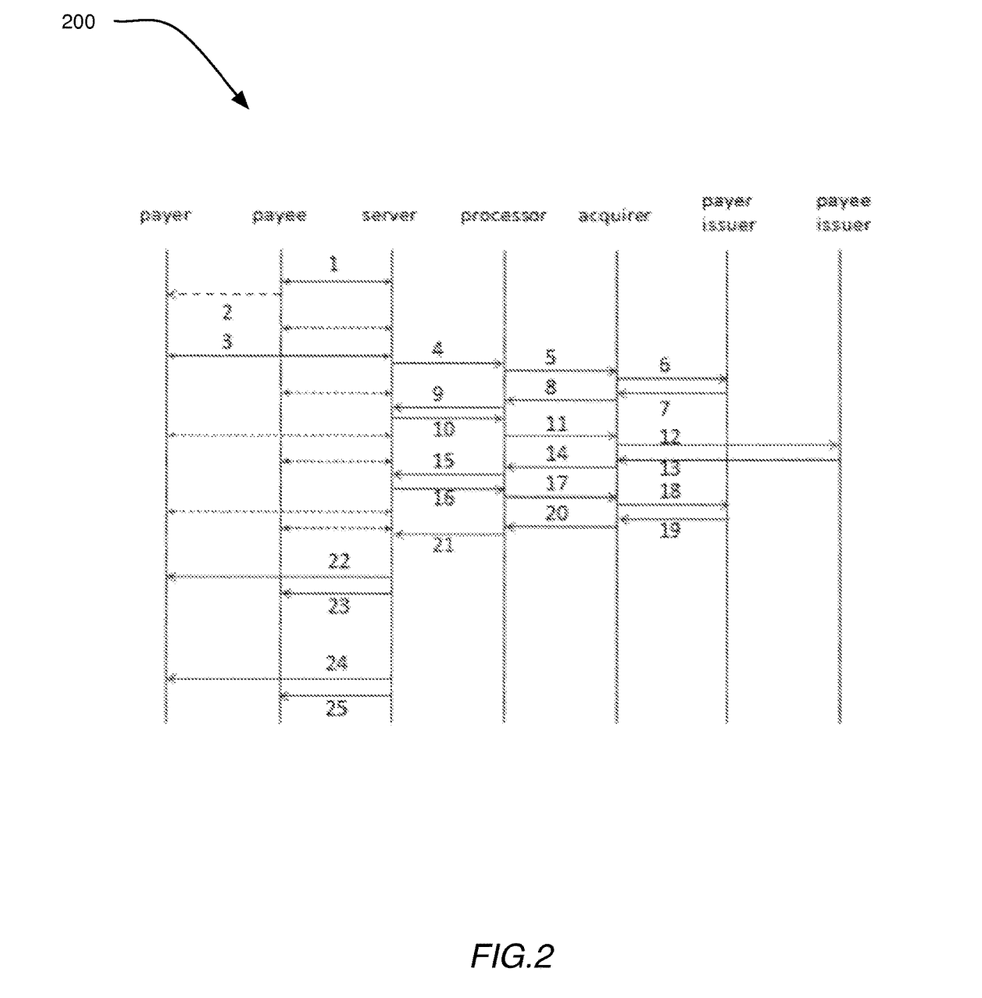
FIG. 2 is a diagram illustrating a method for performing a wireless payment transaction, in accordance with an embodiment of the invention.

Referring to FIG. 2, a method 200 for performing a wireless payment transaction, in accordance with an embodiment of the invention, will now be described. In particular, FIG. 1 depicts the peer-to-peer payment flow among a payer, payee, server, processor, acquirer, payer issuer, and payee issuer. Initially, in operation 1, the payee accesses the server web page or native application and selects the role as "payee" (from options of "payer" and "payee"). Depending on the selection, the appropriate fields are displayed. If the role is "payee", the fields displayed may include: (i) "transaction ID"—provided by the server; (ii) card type (credit or debit); (iii) card number; (iv) expiration date; (v) 3-digit security code (credit) or PIN (debit); (vi) optional email address or phone number for confirmation/receipt; and (vii) optional timeout for asynchronous payment (described below). The payee fills in the fields (with local error checking done on the client browser), and clicks an "ok" button to send the information to the server. The web page or native application stays active and updates the payee with the status of all the payments made from one or more payers until the payee closes the page.

With further reference to FIG. 2, operation 2 involves the payee providing the payer with the transaction ID that was provided by the server in operation 1. In operation 3, the payer accesses the server web page or native application and selects the role of "payer." The fields displayed may include: (i) transaction ID; (ii) card type; (iii) card number; (iv) expiration date; (v) 3-digit security code or PIN; (vi) transaction amount; and (vii) optional email address or phone number for confirmation/receipt. As the payer fills in the transaction amount, the client has the logic to locally compute the fees and display it to the payer. Once the payer clicks the "ok" button, the information is sent to the server in operation 3. The web page or native application stays active until the transaction is completed, and it notifies the payer once this has occurred.

In transactional operations 4-9, the server initiates an authorization of "transaction amount+fee" on the payer's credit or debit account. This comprises a financial authorization transaction request (either single or dual message) sent to the card issuer for authorization along with a processing code (i.e., Field 3, equivalent of ISO 8583, or equivalent message types) value of Service Purchase Debit. If the transaction is declined by the issuer or is determined to be incomplete, the server notifies the payer and payee, and aborts the transaction.

In transactional operations 10-15, the server initiates a transaction to credit the "transaction amount" to the payee's account. For either single or dual message types (0200 or 0100), this comprises a financial authorization message with a processing code (i.e., Field 3, equivalent of ISO 8583, or equivalent message types) value of credit. If the transaction is declined by the issuer or is determined to be incomplete, the server notifies the payer and payee, and aborts the transaction. In cases where a credit card is used, the payer is not charged because the server does not initiate the clearing of the transaction. In cases where a debit card is used, the server must reverse the transaction amount to the payer, and the payer bears the cost of the financial transactions. In transactional operations 16-21, the server completes the transaction with the payer by initiating the offline clearing of the "transaction amount+fee."

During transaction operations 4-21, the both the payer and payee web pages or native applications are updated by periodic client pull messages embedded therein. Interim updates, such as payer authorization successful, payer deposit successful, and payer withdrawal complete, are posted to the pages. For the payee, only the total transaction amount posted is updated, i.e., the credit/debit card details and user login/authentication of the payer are not exposed. Similarly, for the payer, only the total transaction amount posted is updated, i.e., the credit/debit card details and user login/authentication of the payee are not exposed. At the end of transaction operation 21, both the payer and payee web pages or native applications are updated with a transaction completion notification (in operations 22 and 23, respectively). A payee may expect multiple payments, and it is the payee's responsibility to wait until the payments are completed. In a situation wherein the payer navigates away from the web page or native application during the transaction, there is no impact to the transaction, i.e., it is completed as set forth above. In a situation wherein the payee navigates away from the web page or native application during the transaction, the transaction ID is reserved for a predetermined period of time for asynchronous payment. In some embodiments, the transaction ID is available to the payee as an option at the point of initiation of the transaction.

Still referring to FIG. 2, after the transaction is complete, the payer and payee are optionally notified by email or SMS, depending on the selection, in operations 24 and 25, respectively. The server stores the configured information in a cookie at both the payer and payee. For native applications, this information can also be stored locally in the application database. In either case, subsequent accesses to the server can pre-populate the information. Where multiple elements are stored in the cookie or application database, for example if the consumer enters different credit card numbers at different times, a drop down menu can be created on the client. The cookie thereby reduces the amount of information that a consumer needs to enter for each transaction, and achieves the same benefit of a consumer maintaining a profile without having to actually do so in the server.

Figure 3:
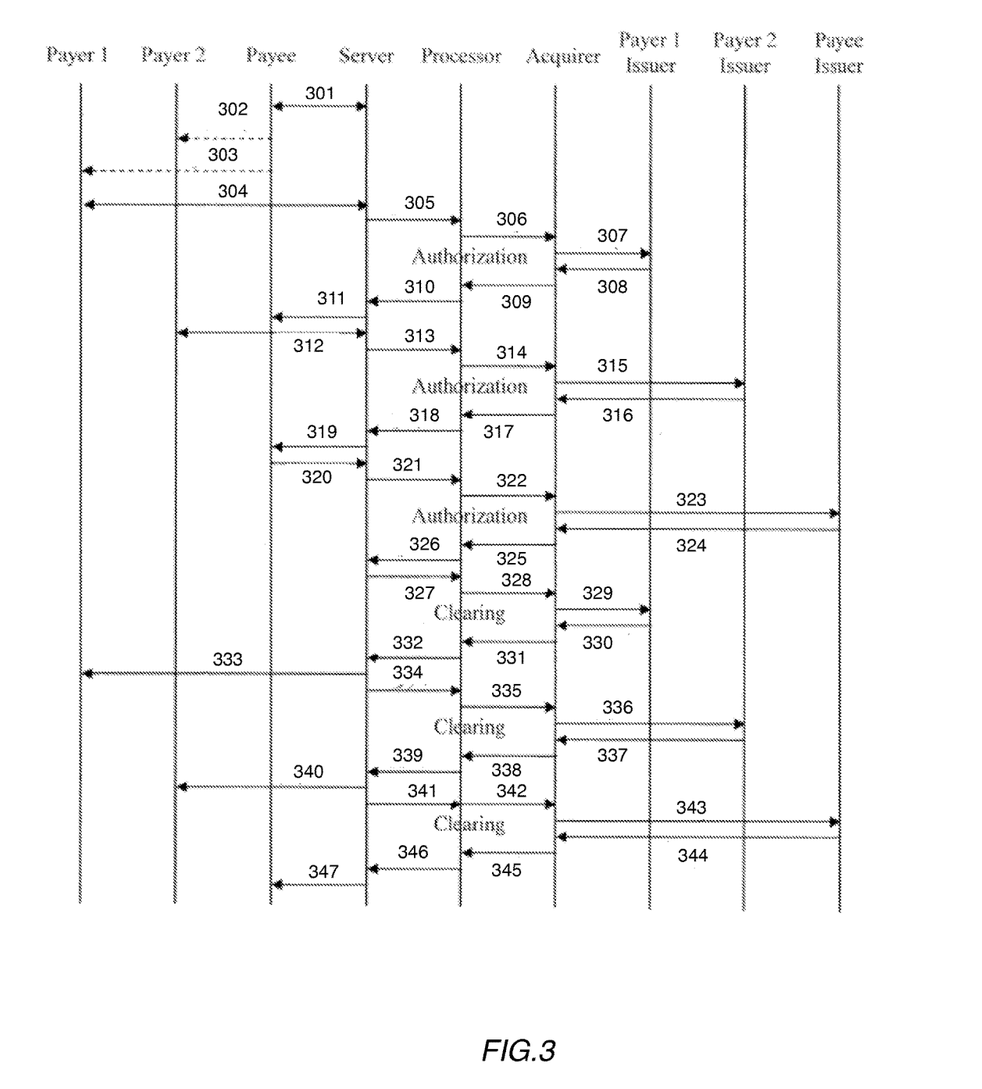
FIG. 3 is a diagram illustrating a method for performing a wireless group payment transaction, in accordance with an embodiment of the invention.

FIG. 3 is a diagram illustrating a method for performing a wireless group payment transaction, in accordance with an embodiment of the invention. In operation 301, payee initiates group payment using a server UI, such as web page, or via a mobile application UI where the application communicates with the server. At the end of operation 301, a group transaction ID is created which will be communicated to each payer in operations 302 and 303. In an online embodiment, the payee enters the payers, whereby each payer s identified by a means that allows the server to send a message to the payee. By way of example, the means may comprise the payers' phone numbers. If the transaction ID is communicated offline, the payees do not need to be enumerated such that only the number of payees is entered.

Subsequently, in operation 301, the payee describes the method by which it can receive the payment, for example by identifying his credit or debit card together with address, expiration date, and/or other verification information typically used in online transactions. Next, the payee commits the information and the server creates a group transaction ID. The payee may then communicate the transaction ID offline to payers for security reasons, for example verbally, in steps 302 and 303. Alternatively, if the payee entered payer identities for secure online notification, the server sends a message to payers with the group transaction ID.

With further reference to FIG. 3, in operations 304 and 312, the payers (e.g., Payer 1 and Payer 2) enter the group transaction ID and the amount each will pay into the server UI together with the payment method information. This information may include debit or credit card information, along with verification information typically used in online transactions. After entering the amount to pay, each payee commits his or her payment.

In operations 305-319, the server performs an authorization of each payer to server transaction, and once completed, informs payers that their payment is now pending payee action. The authorizations, as performed in operations 305-310, 313-318 and 321-326, comprise a financial authorization message exchange, without clearing, which in one implementation propagates over a public network as a HTTPS-secured, API-key-material authenticated exchange between server and processor (in operations 305, 310, 313, 318, 321, and 326). In the back end (i.e., in operations 306-309, 314-317 and 322-325) from the processor via acquirer and over the card network to each participants' issuer and back, the message can be a financial ISO 8583 authorization message exchange.

After each payee has been authorized, the payee receives a notification and then acknowledges the payment in operation 320. This triggers the authorization of the payee's card in operations 321-326 for the server to payee payment and clearing of the payers' payments in operations 327-347. The clearings, as performed in operations 327-332, 334-339 and 341-346, comprise a financial clearing message exchange, without authorization, which in one implementation propagates over a public network as a HTTPS-secured, API-key-material authenticated exchange between server and processor (in operations 327, 332, 334, 339, 341 and 346). In the back end (i.e., in operations 328-331, 335-338 and 342-345) from processor via acquirer and over the card network to each participants' issuer and back, the message can be a financial ISO 8583 clearing message exchange. Each payer is informed by the server of the clearing, and then the transactions from payers to server are cleared for settlement. After settlement, the server to payee payment is cleared for settlement and the payee is notified by the server that the group payment has been cleared.

With continued reference to Figure each payer can cancel his or her participation in the group transaction if it is done before the payee has acknowledged the payment in operation 320. Additionally, the payee can cancel the group transaction at operation 320 instead of acknowledging the transaction. The payee may do this, for example, if the notification indicates that one or more of the payees has cancelled their participation. Alternatively, the payee can lock the group transaction in operation 320 and perform the acknowledgement later, thereby causing an accountless group transaction with a deadline-driven payment. The subsequent acknowledgement can be processed manually or automatically by the server, for example by schedule at the end of month. If the acknowledgement happens significantly later, the payer authorizations may be performed again. In some embodiments, the group transaction can also utilize existing user accounts of payee or payers. In such cases, payment methods can be pre-stored and used without entering them into the server UI.

Figure 4:
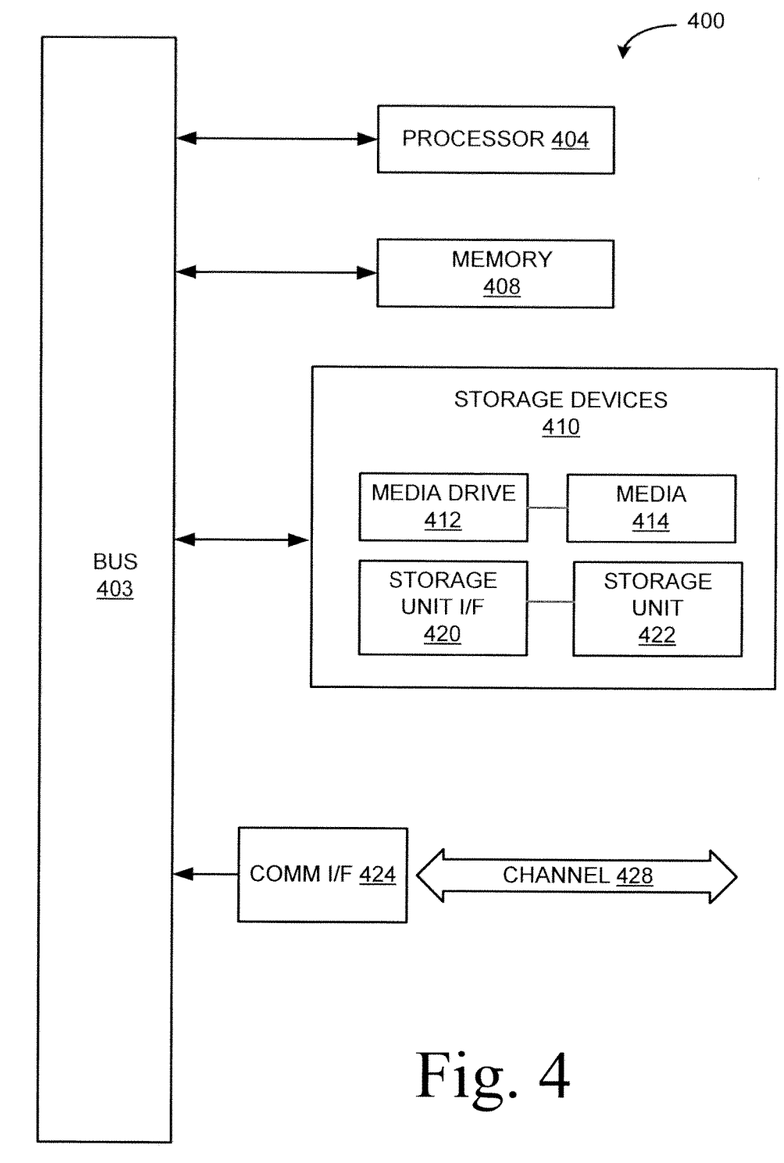
FIG. 4 is a diagram illustrating an example computing module for implementing various embodiments of the invention.

As used herein, the term "module" might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or n total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 4. Various embodiments are described in terms of this example-computing module 400. After reading this description, it will become apparent to a person skilled in the relevant art how to implement the invention using other computing modules or architectures.

Referring now to FIG. 4, computing module 400 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 400 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 403, although any communication medium can be used to facilitate interaction with other components of computing module 400 or to communicate externally.

Computing module 400 might also include one or more memory modules, simply referred to herein as main memory 408. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Computing module 400 might likewise include a read only memory ("ROM") or other static storage device coupled to bus 403 for storing static information and instructions for processor 404.

The computing module 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a floppy disk drive, a magnetic tape drive, an optical disk drive, a CD, DVD or Blu-ray drive (R or RW), or other removable or fixed media drive might be provided. Accordingly, storage media 414 might include, for example, a hard disk, a floppy disk, magnetic tape, cartridge, optical disk, a CD, DVD or Blu-ray, or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing module 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory module) and memory slot, a PCMCIA slot and card, and other fixed or removable storage units 422 and interfaces 420 that allow software and data to be transferred from the storage unit 422 to computing module 400.

Computing module 400 might also include a communications interface 424. Communications interface 424 might be used to allow software and data to be transferred between computing module 400 and external devices. Examples of communications interface 424 might include a modem or softmodem, a network interface such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A computer-implemented method performed by a server device on a data communication network, said method for maintaining a status for an asynchronously-initiated transaction for display to wireless devices making a group payment without requiring user accounts from members of a group, the transaction concerning a wireless and cashless peer-to-peer payment transaction conducted ad hoc from devices on the wireless data communication network, the method of the server device comprising the steps of:
   responsive to a payee accessing a webpage and selecting a payee role for the group and a payment manner, generating, with a processor of the server device, a group transaction ID (identification) for initiating the group payment transaction on behalf of a payee device of the payee to a payer device of a payer as a first step, wherein the group transaction ID is reserved by the server for a predetermined amount of time to facilitate an asynchronous payment by the group members, and wherein neither the payee nor payers maintain accounts with the server device;
   receiving, through a communication interface of the server coupled to the wireless data communication network, a first information from the payee device including the group transaction ID as a second step via at least one of the webpage and the native application, wherein said first information is to facilitate payment from the payer device but does not include information relating to a payer associated with the payer device;
   determining, with the processor, that the group transaction ID from the first information matches the group transaction ID from a second information;
   responsive to the determined match, initiating an authorization of the transaction from the server through an external payment infrastructure on a credit or debit account of the payer, and initiating a transaction to credit a payee's account from the server through the external payment infrastructure while maintaining the webpage or the native application as active until the transaction is completed;
   receiving, at the server from the external payment infrastructure, a result of the authorization;
   receiving, at the server from the payee device through the communication interface, after the step of initiating the transaction, the transaction ID via at least one of said webpage and said native application; and
   notifying a status of the transaction, as reported by the external payment infrastructure, to the payer device, without requiring an account with the server device.

2. The method of claim 1, wherein the group transaction ID is provided to the payer by the payee.

3. The method of claim 1, wherein initiating the authorization of the transaction comprises initiating a financial authorization request including a transaction amount and a transaction fee.

4. The method of claim 3, wherein initiating the authorization of the transaction further comprises sending the authorization request to a card issuer for authorization.

5. The method of claim 1, wherein initiating the transaction to credit the payee's account comprises crediting the transaction amount to the payee's account.

6. The method of claim 1, further comprising notifying the payer and payee, and aborting the transaction, if the transaction is declined by the issuer or is determined to be incomplete.

7. The method of claim 6, wherein the payer is not charged if a credit account is used because the server does not initiate the clearing of the transaction.

8. The method of claim 6, further comprising reversing the transaction amount to the payer if a debit card is used.

9. The method of claim 1, wherein the first information requested from the payee further comprises card type, card number, expiration date, and 3-digit security code or PIN (personal identification number).

10. The method of claim 1, wherein the second information requested from the payer further comprises card type, card number, expiration date, 3-digit security code or PIN (personal identification number), and transaction amount.

11. The method of claim 1, further comprising storing the requested first information and second information from the payee and payer respectively, in a cookie at both the payer and payee to allow subsequent pre-population of the information.

12. A non-transitory, computer-readable medium, storing instructions that, when executed by a processor, perform a method in a server device on a data communication network, the method for facilitating maintaining a status for an asynchronously-initiated transaction for display to wireless devices making a group payment without requiring user accounts from members of a group, the transaction concerning a wireless and cashless peer-to-peer payment transaction conducted ad hoc from devices on the wireless data communication network, the method of the server comprising the steps of:

responsive to a payee accessing a webpage or a native application and selecting a payee role for the group and a payment manner, generating, with a processor of the server device, a group transaction ID (identification) for initiating the group payment transaction on behalf of a payee device of the payee to a payer device of a payer as a first step, wherein the group transaction ID is reserved by the server for a predetermined amount of time to facilitate an asynchronous payment by the group members, and wherein neither the payee nor payers maintain accounts with the server device;

receiving, through a communication interface of the server coupled to the wireless data communication network, a first information from the payee device including the group transaction ID as a second step via at least one of the webpage and the native application, wherein said first information is to facilitate payment from the payer device but does not include information relating to a payer associated with the payer device;

determining, with the processor, that the group transaction ID from the first information matches the group transaction ID from a second information;

responsive to the determined match, initiating an authorization of the transaction from the server through an external payment infrastructure on a credit or debit account of the payer, and initiating a transaction to credit a payee's account from the server through the external payment infrastructure while maintaining the webpage or the native application as active until the transaction is completed;

receiving, from the external payment infrastructure, a result of the authorization;

receiving, from the payee device through the communication interface, after the step of initiating the transaction, the transaction ID via at least one of said webpage and said native application; and notifying a status of the transaction, as reported by the external payment infrastructure, to the payer device, without requiring an account with the server device.

* * * * *